(12) United States Patent
Biester et al.

(10) Patent No.: US 6,505,609 B1
(45) Date of Patent: Jan. 14, 2003

(54) METHOD AND DEVICE FOR DRIVING AT LEAST ONE LOAD

(75) Inventors: Juergen Biester, Boeblingen (DE); Udo Schulz, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 87 days.

(21) Appl. No.: 09/723,089

(22) Filed: Nov. 27, 2000

(30) Foreign Application Priority Data

Nov. 27, 1999 (DE) .......................................... 199 57 181

(51) Int. Cl.[7] ........................... F02D 41/22; G06F 19/00
(52) U.S. Cl. ..................... 123/479; 701/107; 701/114
(58) Field of Search ................................ 123/479, 480, 123/482, 486, 472, 478; 701/101, 102, 107, 114; 251/129.15, 129.18

(56) References Cited

U.S. PATENT DOCUMENTS

| | | | | |
|---|---|---|---|---|
| 4,279,229 A | * | 7/1981 | Arnold et al. | 123/353 |
| 4,886,114 A | * | 12/1989 | Perkins et al. | 251/129.04 |
| 5,701,870 A | * | 12/1997 | Gottshall et al. | 123/490 |

FOREIGN PATENT DOCUMENTS

| | | | | |
|---|---|---|---|---|
| JP | 58-28074 | * | 2/1983 | F16K/31/02 |
| JP | 4-24414 | * | 1/1992 | F23N/5/20 |
| JP | 197 01 471 | | 7/1998 | |
| JP | 11-247699 | * | 9/1999 | F02D/41/22 |

* cited by examiner

Primary Examiner—Hien T. Vo
(74) Attorney, Agent, or Firm—Kenyon & Kenyon

(57) ABSTRACT

A method and a device for driving at least one load, in particular a solenoid valve for controlling the injection of fuel in an internal combustion engine. Using at least one switching element, the current flowing through the load is controlled as a function of a control signal. In the presence of at least one safety signal, the load is driven such that it adopts a safe state.

6 Claims, 3 Drawing Sheets

METHOD AND DEVICE FOR DRIVING AT LEAST ONE LOAD

BACKGROUND INFORMATION

A method and a device for driving an electromagnetic load are described in German Patent No. 197 01 471. There, a method and a device are described for controlling solenoid valves that control the injection of fuel in an internal combustion engine. In particular, a so-called Common Rail System, driven by a solenoid valve, is described. Usually, for an accelerated switching on of the injectors, a so-called booster capacitor is used, which is charged at a voltage that is increased in comparison to the supply voltage. The capacitor is usually charged in a so-called Rapid Quenching Phase between two firings. In longer decelerations (cut-off phases) of the engine, i.e., in phases in which there is no injection, the capacitor discharges. The consequence of this is that in the next injection, the switching operation of the valve does not take place as rapidly as prescribed. To avoid this disadvantage, it is provided in the related art that after a longer pause between injections, the capacitor is charged before the next injection.

During recharging in the recharge phase, current flows through the load for a brief time such that the load in normal operation does not respond. The voltage induced by an interruption of the flow of current acts to charge the capacitor. In this context, under unfavorable conditions, it can happen that the load responds and a small quantity of fuel is metered out.

In devices of this type, the injectors must reliably be prevented from metering out any fuel in operating states in which no injection is called for, i.e., if the internal combustion engine is to be switched off.

SUMMARY OF THE INVENTION

On the basis of the mode of operation according to the present invention, it is possible to achieve increased safety in controlling the fuel injection. It is especially advantageous that the safety device can also be checked.

DETAILED DESCRIPTION

The device according to the present invention is preferably used in internal combustion engines, especially in self-ignition internal combustion engines. There, electromagnetic valves act to control the fuel metering. In what follows, these electromagnetic valves are designated as loads. The present invention is not limited to this application but can be used everywhere that electromagnetic loads are required.

In the application in internal combustion engines, especially in self-ignition internal combustion engines, the opening and closing time point of the solenoid valve determines the commencement and termination of the injection of fuel into the cylinder.

Figure 1:
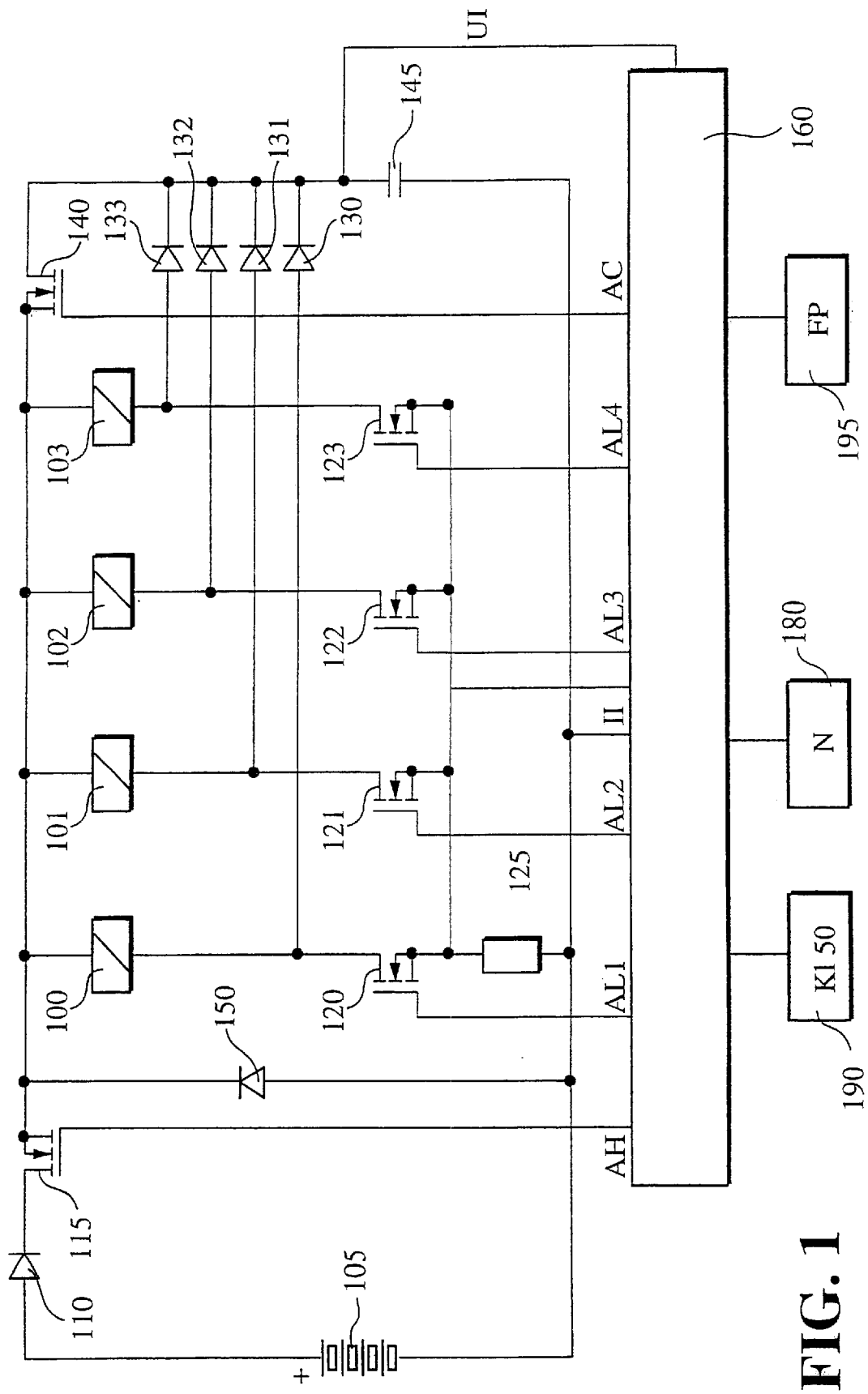
FIG. 1 depicts a circuit arrangement for various loads.

In FIG. 1, the important elements of the device according to the present invention are depicted. The depicted exemplary embodiment is a four-cylinder internal combustion engine. In this context, each load has assigned to it an injection valve and each injection valve has assigned to it a cylinder of the internal combustion engine. In internal combustion engines having a greater number of cylinders, correspondingly more valves, switching means, and diodes are provided.

100, 101, 102, and 103 designate four loads. In each case, a first terminal connection of loads 100 through 103 is connected via a switching element 115 and a diode 110 to a voltage supply 105.

Diode 110 is arranged such that it is connected to the positive pole by its anode and to switching element 115 by its cathode. Switching element 115 is preferably a field-effect transistor.

In each case, the second terminal connection of loads 100 through 103 is connected via a second switching element 120, 121, 122, and 123, respectively, to a resistance element 125. Switching elements 120 through 123 are also preferably field-effect transistors. Switching elements 120 through 123 are termed low-side switches and switching element 115 is termed a high-side switch. The second terminal connection of resistance element 125 is connected to the second terminal connection of the voltage supply.

Each load 100 through 103 has assigned to it a diode 130, 131, 132, and 133. In each case, the anode terminal connection of the diodes is in contact with the junction point between the load and the low-side switch. The cathode terminal connection is connected to a capacitor 145 and to a further switching element 140. The second terminal connection of switching element 140 is in contact with the first terminal connections of loads 100 through 103. Switching element 140 is also preferably a field-effect transistor. This switching element 140 is also termed a booster switch. The second terminal connection of capacitor 145 is also connected to the second terminal connection of voltage supply 105.

A control unit 160 impacts upon high-side switch 115 using a driving signal AH. Switching element 120 is impacted upon by control unit 160 using a driving signal AL1, switching element 121 using a driving signal AL2, switching element 122 using a driving signal AL3, switching element 123 using a driving signal AL4, and switching element 140 using a driving signal AC.

Between the second terminal connection of voltage supply 105 and the junction point between switching element 115 and the first terminal connections of loads 100 through 103, a diode 150 is connected. In this context, the anode of the diode is connected to the second terminal connection of voltage supply 105.

The control unit, inter alia, processes signal N of an engine speed sensor 180 and of a sensor 195 indicating gas pedal position FP, as well as voltage 190 applied at a terminal 50. At so-called terminal 50, a voltage is applied when the starter is actuated. A voltage at terminal 50 indicates an actuation of the starter or an imminent start of the internal combustion engine.

By evaluating the voltage drop at resistor 125 by the control unit 160, the current flowing through the load is measured by the control unit.

Using the depicted arrangement, measuring the current passing through current-measuring resistor 125 is only possible if one of switching elements 120 through 123 is closed. In order to be able to measure the current also when low-side switches are opened, the current-measuring resistor can also be disposed at a different location. For example, the second terminal connection of capacitor 145 can be connected to the junction point between current-measuring element 125 and switching elements 120 through 123. In this case, a current measurement is possible even when the low-side switch is blocked. In addition, the current-measuring element can be arranged between the voltage supply and the high-side switch or between the high-side switch and the loads.

Figure 2:
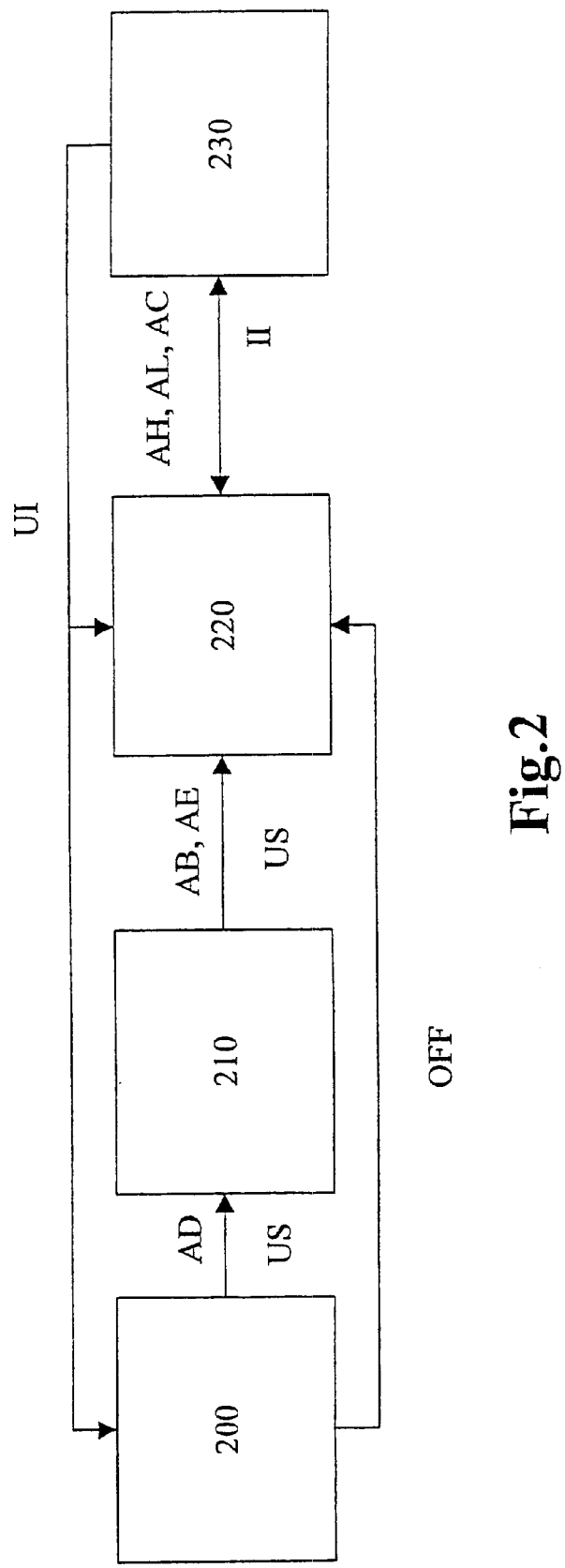
FIG. 2 depicts a block diagram of the control unit.

In FIG. 2, control unit 160 is depicted in detail. Control unit 160 is essentially made up of a computer 200, a converter 210 and an actuator driver 220. Computer 200 impacts upon converter 210 using a driving signal AD and a signal US. Signal AD essentially determines the driving durations at which the loads are to be driven. Converter 210 is preferably configured as a so-called gate array and, on the basis of driving duration AD and setpoint voltage US, which is to be applied at booster capacitor 145, determines the signals characterizing the driving commencement, driving termination AE, and setpoint voltage US. Actuator driver 220 converts signals AB, AE, and US into signals AH, AL1 through AL4, or AC, and the various switching elements contained in output stage 230 are reversed by these signals.

In FIG. 1, a possible embodiment of output stage 230 is depicted in detail. In this context, the mode of operation according to the present invention is not limited to this specific embodiment of the output stage, but can also be used in other output stages. In particular, output stages having smaller or larger numbers of switching elements are possible.

Computer 200, converter 210, and actuator driver 220 essentially make up control unit 160 of FIG. 1. The switching elements and the different diodes as well as capacitor 145 constitute output stage 230. Output stage 230 transmits back to the actuator driver signals II, characterizing the current flowing through the load, as well as voltage UI, applied at booster capacitor 145.

Usually, actuator driver 220 is configured such that the recharging of the booster capacitor is carried out if voltage UI drops below a threshold value S1. As an alternative or a supplement, it can be provided that voltage UI is also reconducted to computer 200. Computer 200, by stipulating a given value for the driving duration, activates the recharging. In recharging, the value 0 is preferably selected for driving duration AD.

In recharging booster capacitor 145, the usual procedure is for current II flowing through the load to be adjusted to a value at which the load does not react. Under favorable circumstances, it can happen that the load responds despite the low current. This is undesirable and is to be safely prevented by the method according to the present invention. Therefore, according to the present invention, it is provided that computer 200 supplies a safety signal OFF to actuator driver 220. This safety signal OFF has the consequence that low-side switches 120, 121, 122, and 123 and/or high-side switch 115 are driven such that they interrupt the flow of current. In this way, it is assured that no current flows through the load in the presence of an off signal. In the presence of safety signal OFF, the load is driven such that it adopts a safer state. In particular, the safety signal assures that the load adopts a safe state independent of driving signal AD.

Computer 200 calculates driving duration AD on the basis of different operating parameters, such as rotational speed N and driver input, which are measured using sensor 195. Converter 210, takes into account, inter alia, the reaction and switching times of the load and, on the basis of the desired driving duration, calculates the driving commencement and the driving termination.

Figure 3:
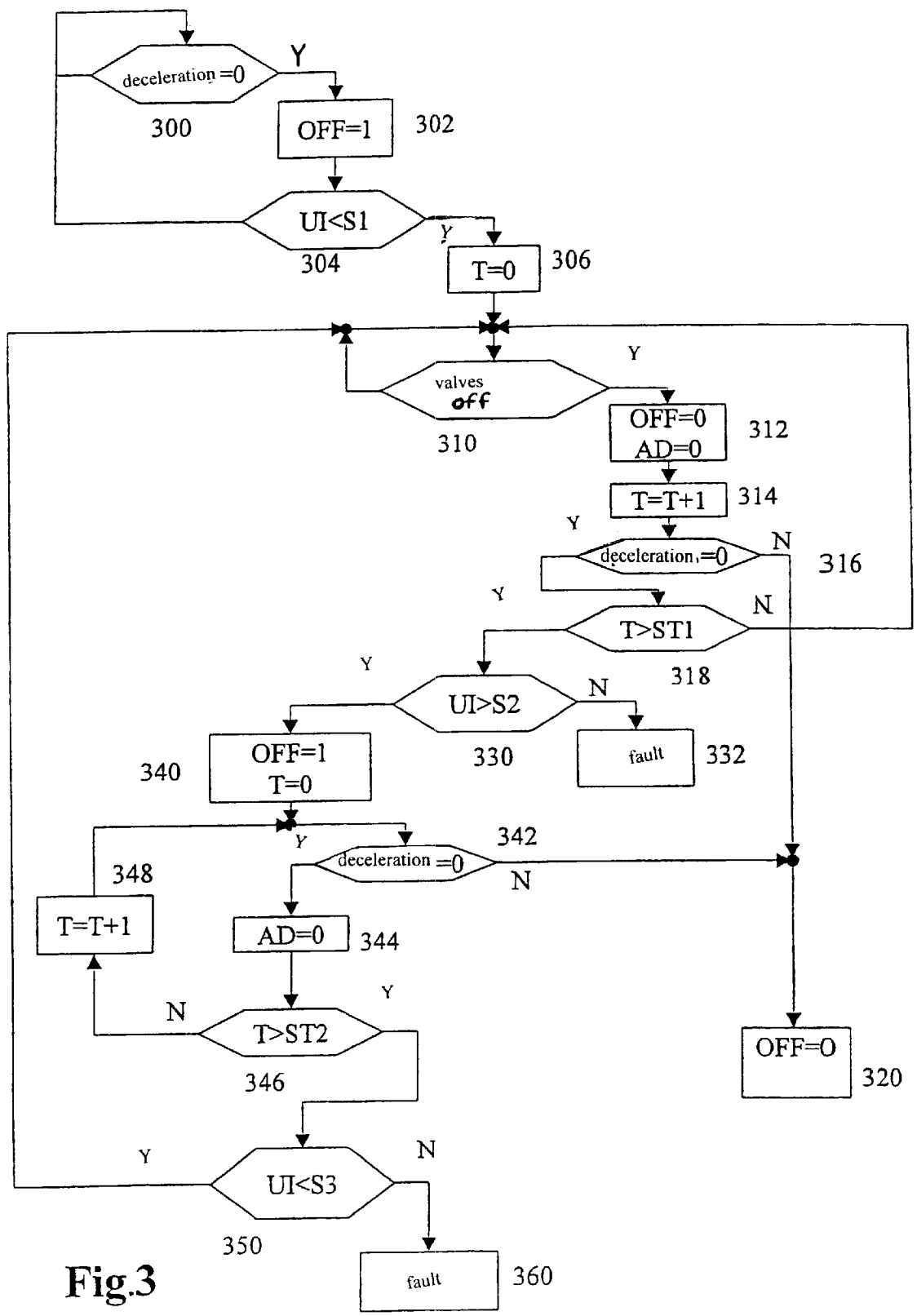
FIG. 3 depicts a flowchart of the mode of operation according to the present invention.

The mode of proceeding according to the present invention is depicted in detail in FIG. 3 as a flowchart. A first query 300 checks whether an operating condition is present in which there is no injection. This is the case, for example, in deceleration. If this is not the case, then query 300 is carried out once again. If it is the case, i.e., an operating condition does exist in which no injection is occurring, then, in step 302, safety signal OFF is activated, i.e., is set at 1. Subsequent query 304 checks whether voltage UI, applied at booster capacitor 145, is smaller than a threshold value S1. If this is not the case, then query 300 is carried out once again.

If voltage UI at booster capacitor 145 has dropped below a first threshold value S1, then in step 306 a time meter T is set at 0. Subsequent query 310 checks whether an operating state exists in which no combustion is possible. That is, query 310 checks whether the crankshaft or camshaft is occupying a position in which an injection is safely possible, without the injection contributing to the torque. If this is not the case, then query 310 is carried out once again. If query 310 detects that an operating state exists in which an injection would be safely possible, then step 312 follows. In step 312, the safety signal is set at 0, i.e., it is no longer active. At the same time, driving duration AD=0 is set. Subsequently, in step 314, the time meter is increased. Query 316 checks whether the operating state in which there is no injection still exists. If this is not the case, then the program terminates in step 320. In step 320, the safety signal is set at 0, a current flow through the load is not possible, and the normal control program is executed.

In a simplified configuration, query 310 can be omitted.

If query 316 detects that the operating state still exists in which no injections are possible, then a subsequent query 318 checks whether content T of the time meter is greater than a first time-threshold value ST1. If this is not the case, then query 310 is carried out once again. If this is the case, then step 330 follows.

In the mode of operation depicted above, it is assured that the booster capacitor is charged if voltage UI at the booster capacitor drops below a threshold value S1. In the specific embodiment depicted, the charging process takes place only if voltage UI is smaller than a threshold value S1, and no injection is taking place. During the first part of the charging process, driving duration AD=0 is given by computer 200 to converter 210 and, at the same time, safety signal OFF is active such that driving the load is not possible and the capacitor charge is decreasing. During the second part of the charging process, the safety signal OFF is inactive and the charge increases above the second threshold value S2. During the third part of the charging process, the safety signal is again active and the capacitor charge decreases again below threshold value S3.

In one particularly advantageous configuration, it is provided that the charging process only takes place in those time segments in which a possibly subsequent injection will not lead to a combustion of fuel. That is, the charging process is only enabled in certain angle ranges of the crankshaft and the camshaft.

Query 330 checks whether voltage UI is larger than a second threshold value S2. If this is not the case, then in step 332 a fault is detected. If this is the case, i.e., voltage UI is greater than second threshold value S2, then step 340 follows.

Query 330, in connection with query 318, checks whether a given voltage value S2 is achieved within a given time ST1. If voltage S2 is not achieved in the prescribed time ST1, then a fault in the area of output stage 230 and/or of control unit 220 can be assumed. In particular, a fault in the area of controlling the charging process is probable. A fault is detected if the voltage at the booster capacitor does not rise to an expected value if the safety signal is not present, OFF=0.

As an alternative to query 304, it can also be provided that the charging process be carried out in a time-controlled manner. That is, after the elapsing of a preestablished waiting period after the beginning of the deceleration, or of an operating state in which there is no injection, the charging process is initialized beginning at step 306.

If in step 330, it is detected that the charging process is proceeding normally, then a check is carried out using safety signal OFF. For this purpose, in step 340, safety signal OFF is set such that no injections can occur. At the same time, time meter T is set at 0. Subsequent query 342 checks whether the deceleration is still present. If this is not the case, then the program also terminates in step 320. If query 342 detects that the deceleration is still present, then in step 344 the driving duration is set at 0. Subsequent query 346 checks whether the time meter is greater than a second time threshold ST2. If this is not the case, then in step 348, the time meter is increased and the process continues with query 342. If query 346 detects that time T is greater than time threshold value ST2, then in step 350, it is checked whether voltage UI is smaller than a third threshold value S3. If this is not the case, then in step 360 a fault is detected. If this is the case, then the process contints in step 310.

This means that if a normal charging of the booster capacitor is detected, the charging process is continued, the safety signal being active. If safety signal OFF is transmitted in a normal manner and is processed, then as a result of this safety signal the charging process is terminated. In normal functioning of the safety signal, voltage UI at the booster capacitor must have dropped beneath a threshold value S3 within a given time ST2. If this is the case, then normal mode of functioning of the safety signal can be assumed. In this case, the booster capacitor is charged in order that a normal operation of the load can be assured at the next injection.

However, if in the presence of the safety signal the voltage does not drop below threshold value S3, then the charging process was carried out despite the safety signal being present, this meaning that safety signal OFF did not lead to an interruption in the circuit closing. In step 360, this is detected as a fault.

According to the present invention, the mode of operation of the safety signal is checked on the basis of the condition of the booster capacitor, which can also be termed a storage means. In particular, a fault is detected if in the presence of the safety signal the voltage in the booster capacitor deviates from an expected value. That is, a fault is detected if the voltage is greater than threshold value S3. That is, a fault is detected if during the recharging and in the presence of the safety signal, the condition of the storage means changes unexpectedly. In particular, a fault is detected in the area of the safety signal if in the presence of the safety signal the voltage does not drop during recharging.

As a result of the mode of proceeding according to the present invention, it is assured that even in the case of faulty functioning in the switch-off path, the deceleration, i.e., the state of no injection, is reliably assured. At the same time, the switch-off path in deceleration can very easily be tested for its mode of operation.

What is claimed is:

1. A device for driving a solenoid valve for controlling an injection of fuel in an internal combustion engine, comprising:
   at least one switching element for controlling a current flowing through the solenoid valve as a function of a control signal;
   means for driving the solenoid valve, in the presence of at least one safety signal, such that the solenoid valve adopts a safe state;
   a storage device for the solenoid valve; and
   means for checking an operation of the safety signal as a function of a condition of the storage device.

2. A method for driving a solenoid valve for controlling an injection of fuel in an internal combustion engine, comprising the steps of:
   using at least one switching element, controlling a current flowing through the solenoid valve as a function of a control signal;
   in the presence of at least one safety signal, driving the solenoid valve such that the solenoid valve adopts a safe state;
   recharging a storage device for the solenoid valve; and
   checking an operation of the safety signal as a function of a condition of the storage device.

3. The method according to claim 1, further comprising the step of detecting a fault if, during a recharging of a storage device, a condition of the storage device does not exhibit a predetermined change.

4. The method according to claim 1, further comprising the step of detecting a fault if, in the presence of the safety signal, a voltage at a storage device deviates from a predetermined value.

5. The method according to claim 4, wherein the fault, is detected if, in the presence of the safety signal and during recharging of the storage device, the voltage at the storage device does not drop.

6. The method according to claim 4, further comprising the step of detecting a fault if, when the safety signal is not present during recharging of the storage device, the voltage at the storage device does not rise.

* * * * *